United States Patent [19]

Davis

[11] 3,939,715

[45] Feb. 24, 1976

[54] METHOD AND APPARATUS FOR DEVELOPING BALANCE INFORMATION FOR ROTATING EQUIPMENTS AND ASSEMBLIES

[75] Inventor: Robert D. Davis, Spring Valley, Calif.

[73] Assignee: Spectral Dynamics Corporation of San Diego, San Diego, Calif.

[22] Filed: June 24, 1974

[21] Appl. No.: 482,336

[52] U.S. Cl. .................................................. 73/462
[51] Int. Cl.² ........................................... G01M 1/22
[58] Field of Search ........................... 73/462–465; 235/151.3; 328/24, 27

[56] References Cited
UNITED STATES PATENTS

| | | |
|---|---|---|
| 3,098,391 | 7/1963 | Maus et al. ............................ 73/462 |
| 3,340,476 | 9/1967 | Thomas et al. ....................... 328/27 |
| 3,500,213 | 3/1970 | Ameau .............................. 328/27 X |

Primary Examiner—James J. Gill
Attorney, Agent, or Firm—Brown & Martin

[57] ABSTRACT

A system for determining the phase displacement of vibration data signals relative to tachometer point signals by synthesizing a sine wave signal having the amplitude of the vibration data signals, shifting the phase of the synthesized sine wave signal to null out the vibration data signals and determining the phase and amplitude of the synthesized sine wave signal relative to the tachometer point signals.

22 Claims, 16 Drawing Figures

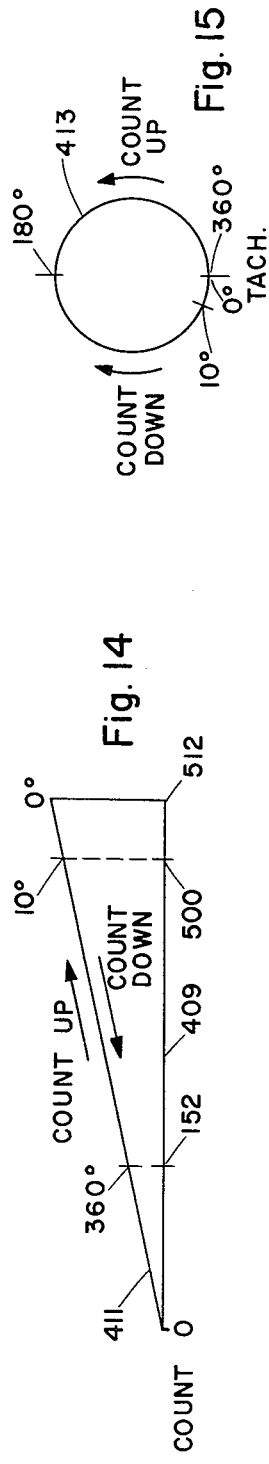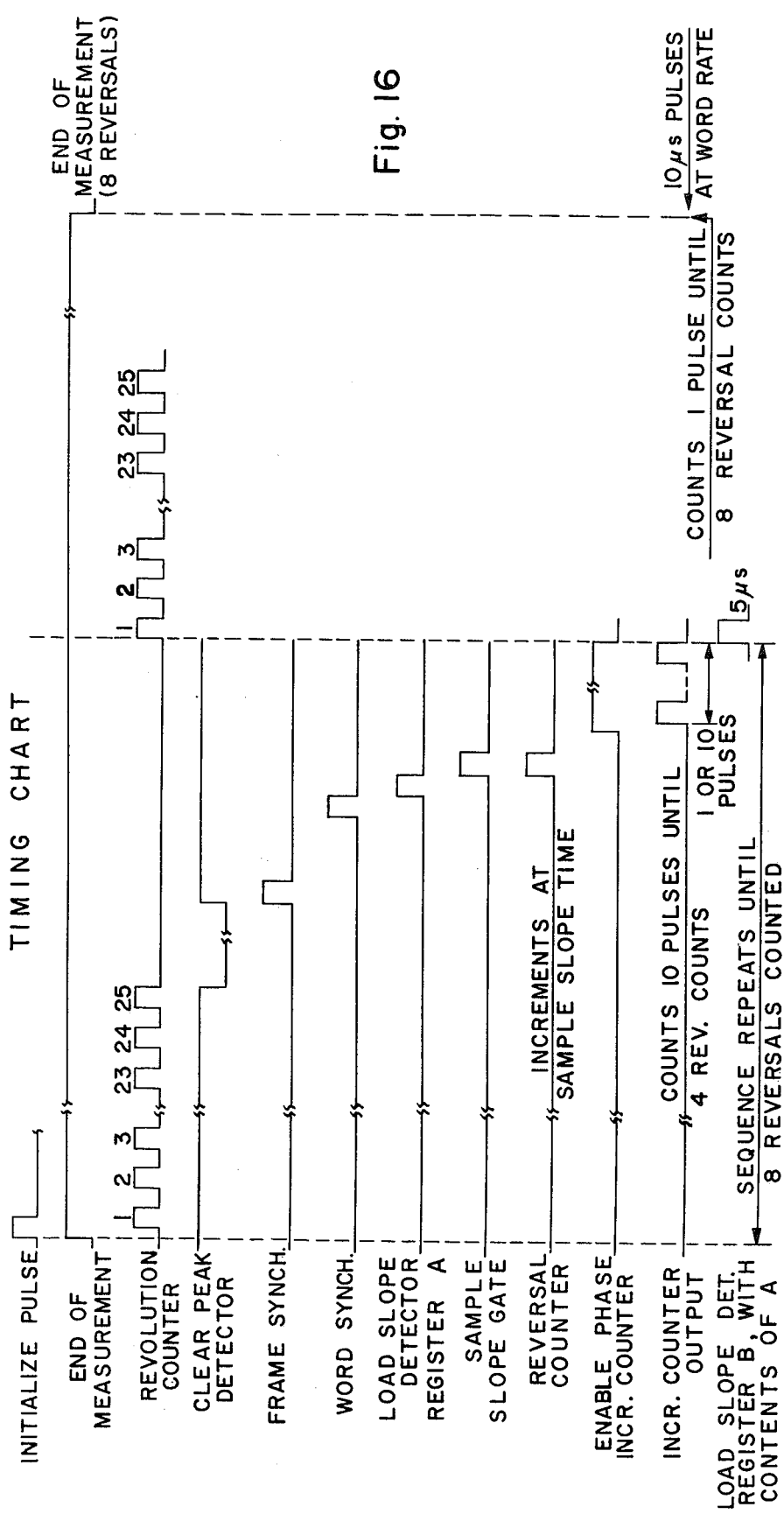

METHOD AND APPARATUS FOR DEVELOPING BALANCE INFORMATION FOR ROTATING EQUIPMENTS AND ASSEMBLIES

BACKGROUND OF THE INVENTION

Balance systems are used to develop trim balance information for rotating equipments and assemblies. These balance systems determine the unbalance of rotating equipments relative to a given point location on the rotating element, generally identified by a tach signal, and also determine the amplitude of the unbalance. With this information, it is then possible to place weights on the equipment opposite the unbalance to balance the rotating member. The information desired is revolutions per minute, the exact location of the unbalance, and the amount of weight required for balancing.

The tachometers used provide normal tachometer signals and the vibration data signal pickups are known vibration signal generators. In known systems for making such trim balance information determinations, the vibration or displacement data signal is fed through a tracking filter through which the amplitude or displacement of the signal is determined. A sine wave is generated that is frequency and phase coherent with the tachometer signal. Then a phase comparison is made of the fundamental of the vibration data signal relative to the tachometer signal that establishes the phase displacement of the unbalance, and thus its location.

In the present system for determining balance information, the vibration data signal is nulled by successive automatic adjustments of the phase of a synthesized sine wave relative to the tachometer signal, thus providing an automatic means for bracketing the fundamental of the input vibration unbalance signal through successive bracketing adjustments of the phase of the synthesized sine wave. This provides automatic and positive locating of the phase displacement of the input data signal and thus the desired phase displacement and location of the unbalance.

SUMMARY OF THE INVENTION

In a preferred embodiment of this invention, input vibration pickup data signals or unbalance signals are fed to a summing amplifier. A series of multiple clocking tach signals are generated from tachometer signals input. These tach signals synchronize a sine converter that generates a synthesized sine wave that is frequency and phase coherent with the input tach signals and the unbalance vibration data signals. The amplitude of the input data signals are determined in a real time spectrum analyzer and the magnitude of the synthesized sine wave is set to the same magnitude. The sine wave is then shifted in phase relative to the tach signal, in a series of automatic displacement steps until the synthesized sine wave nulls out the input data signals. This highly selective null is detected in the real time analyzer. A constant readout of the phase of the sine wave provides the final balance phase displacement of the unbalance of the rotating equipments. All of the amplitude determination, sinewave generation, and movement of the bracketing of the phase displacement is accomplished automatically in a series of steps.

It is therefore an object of this invention to provide a new and improved method and apparatus for developing balance information for rotating equipments and assemblies.

Referring now to the drawings, wherein like reference numerals designate like parts throughout and in which:

FIG. 14 is a diagrammatic illustration of the count and phase relationship in the phase counter circuit of FIGS. 1 and 6.

FIG. 15 is a diagram of the count and phase relationship relative to the rotating mechanism.

FIG. 16 is a timing chart illustrating the pulse timing for various operational phases of the circuit of FIG. 1.

Figure 8:
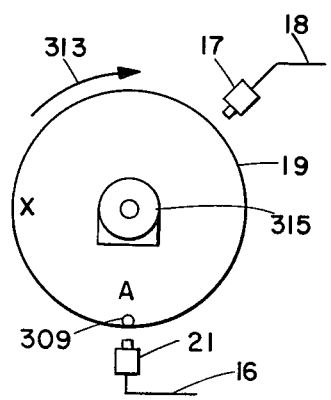
FIG. 8 is a schematic diagram of the location of unbalance relative to a tachometer reference that provides the data to develop the trim balance data.
Figure 9:
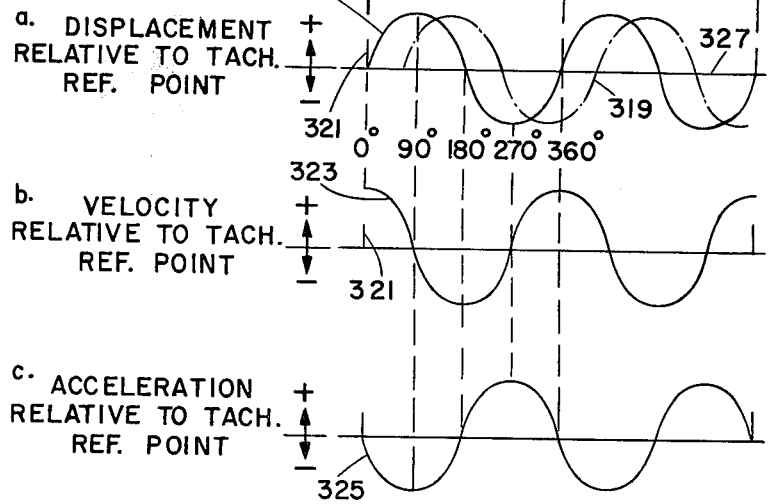
FIG. 9 is a schematic diagram of the phase relationship of unbalance data relative to displacement, velocity and acceleration.

Referring now to FIGS. 8 and 9, in the operation of the method and apparatus for developing trim balance information for rotating equipment and assemblies, an exemplified rotating assembly 19 rotates around a normal bearing support 315. The rotating assembly can be any rotating mass such as, for example, jet engines, turbines, generators, alternators, gas and diesel engines, drive shafts, gyros, etc. A tachometer 21 sends a tach signal through line 16 to the circuit illustrated in FIG. 1. This tach signal is initiated by an appropriate transmitter 309, that causes the tachometer to generate a pulse each time the position "A" of the rotating mass passes the tachometer reference point at tachometer 21. A transducer, that may be any suitable vibration motion transducer that may be mounted on the housing supporting the rotating member 19, provides vibration information in the form of electrical signals to the operating circuit of FIG. 1.

To relate the vibration motion of the rotating member 19 to the rotation of the member 19 during this same time period, it is assumed relative to the diagrams of FIG. 9 that an unbalance exists at location or point X on the rotating member 19. This point X is 90° from the tachometer reference point "A". As the rotating member 19 rotates, the vertical motion of the displacement changes as illustrated in FIG. 9, relative to the respective tachometer reference points 321. By defining one revolution of the unbalanced point X on the member 19 as the completion of a 360° cycle, and designating the tachometer reference point "A" as the 0° reference point, it may be seen that maximum positive displacement occurs 90° after the tach pulse 321. A minimum displacement occurs again at 180° and the maximum negative displacement occurs at 270° with respect to the 0° tachometer reference point.

The same vibratiory motion can be measured as a function of the velocity of the unbalance. In FIG. 9b, the velocity curve 323 of the same unbalance mass point X of FIG. 8, shows that velocity is 0° when displacement is maximum, either up or down. This results because to change direction there has to be a motionless instant. Since the velocity is greatest at zero displacement, it can be seen that the maximum positive velocity occurs at 0° and 360° with respect to the tach reference point "A"; therefore, velocity leads displacement by 90°.

FIG. 9c illustrates the acceleration curve 325 showing the instantaneous weight value of the acceleration in "G" force is zero when displacement is zero. Maximum positive acceleration occurs at maximum negative displacement. The acceleration of the unbalance can also be used to measure the vibration motion. As the acceleration curve 325 shows, the "G" force is zero when displacement is zero, maximum acceleration occurs when displacement is at the maximum negative value, with respect to the tach reference, and maximum acceleration occurs at 270°. Thus acceleration leads velocity by 90° and leads displacement by 180°.

It is evident that a definite phase relationship between a reference point on a rotating mechanism and the location of an unbalance in the rotating mechanism may be measured by sensing displacement, velocity or acceleration. The method and apparatus of this invention accepts a vibration signal from an accelerometer, velocity or displacement type pickup. From an accelerometer or velocity type pickup, the input circuits such as the data signal conditioner 22, see FIG. 1, integrates the signal so that the processed signal is always in terms of displacement. A double integrater is used if the signal is from an accelerometer and a signal integrater is used for a velocity signal. The phase relationship of either of the integrated signals with respect to a given reference point is the same as for a signal from a displacement pickup, with an accelerometer signal the double integration process shifts the phase by 180°. In the case of a velocity signal, the single integration process shifts the phase by 90°.

While the simplest mass to balance is one that is relatively narrow axially, compared to its diameter, and is known to exert no dynamic coupling, normally items such as jet engines, turbines, generators, alternators, gas and diesel engines, drive shafts, gyros and the like have a more complex balance problem. Yet such rotating mechanisms can be represented by essentially a symmetrical disc on a true running shaft that rotates in bearings. Under these assumed conditions, a single corrective weight placed at a chosen radius opposite the radius whose forcing function caused the unbalance, will be sufficient to produce the balance and therefore eliminate vibration at both bearing pedestals simultaneously. Because of the physical characteristics as distinct from the dynamic characteristics of the rotating member, most of the more complex systems still of necessity have to be treated in the same manner as for "single plane" balancing. Yet procedures for final balancing are based on unbalanced vectors and vibration vectors as can be expressed in complex equations. A simplified procedure is to use polar coordinate graph paper to allow the operator to quickly determine location and the amount of weight necessary to balance a rotating device, after the magnitude of the unbalance and its location is determined. So in actual installations to provide trim balance information for rotating devices, an accelerometer, velocity or displacement type pickup is normally attached to the outer casing of the engine and senses the vibrations caused by an unbalance, and a tach senses engine speed for use as the reference frequency and for a display of speed in RPM.

Figure 1:
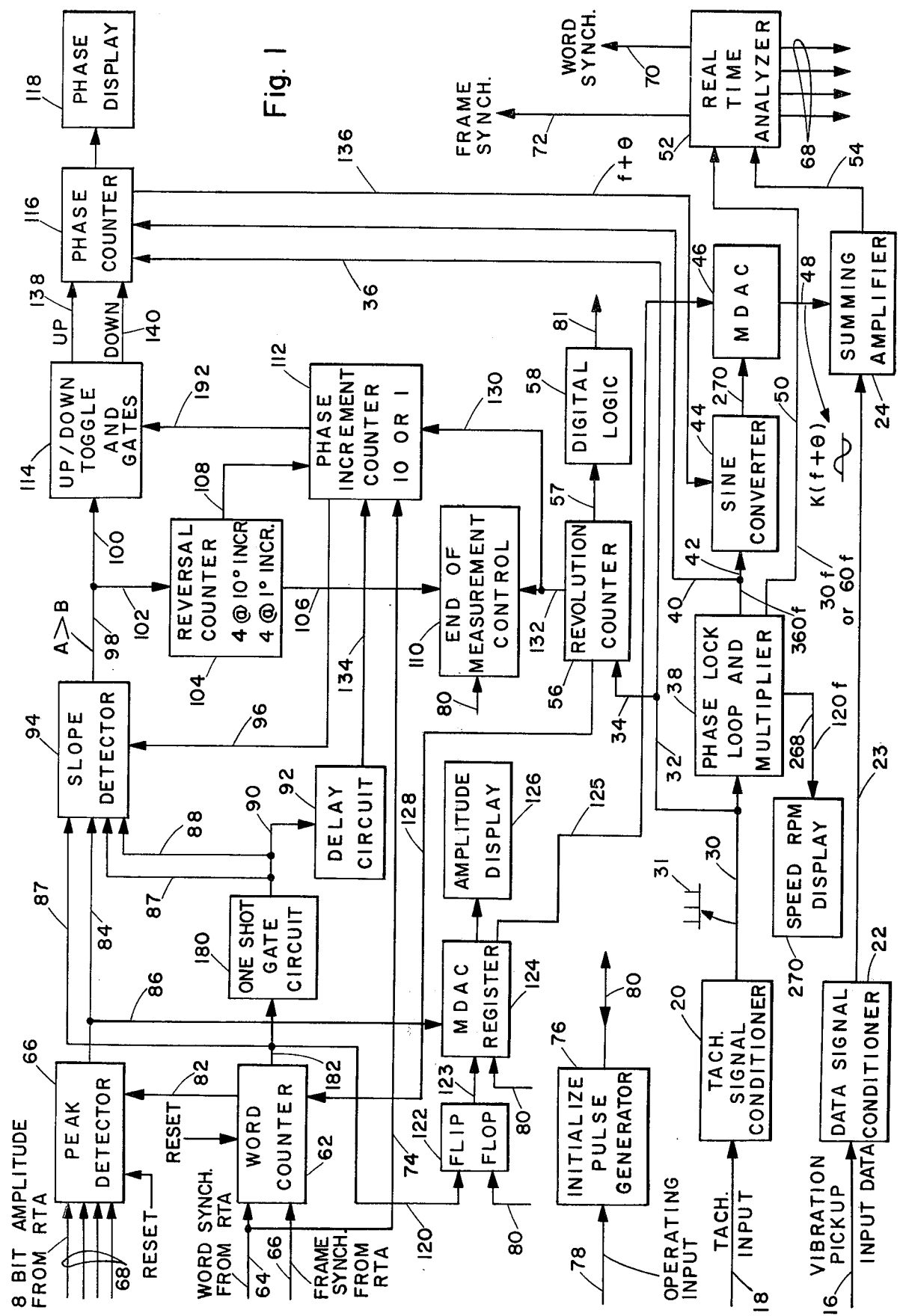
FIG. 1 is a block diagram of an embodiment of the electrical circuit of the invention.

Referring now to FIG. 1, the input tach signals are fed through line 18 to the tach signal conditioner 20. When the tach signal level exceeds the preset threshold, the signal conditioner 20 provides output spikes 31. The tach signal conditioner includes an automatic gain control circuit that regulates the level of the accepted signal. The output tach signals are supplied through line 30 to the phase lock loop and multiplier 38 and line 32 and line 34 to the revolution counter 56 and through line 36 to the phase counters 116. The vibration pickup data is fed through line 16 to the data signal condition 22 that accepts the vibration data signal from an accelerometer, velocity or displacement type pickup. As previously described, appropriate integrator circuits are employed in the data signal conditioner so that the conditioned output signal is always in displacement. Also the signal conditioner has a gain setting control to set the desired gain of the signal so that the signal may be normalized with the sensitivity of the pickup used for acceptance by the processing circuit. The data signal conditioner 22 feeds the data signal through line 23 to the summing amplifier 24, that sums the data signal with a synthesized sine wave supplied through line 48 from the MDAC 46. This summed data signal is then fed through line 54 to the real-time analyzer (RTA) 52. In initial operation, as will be explained hereinafter, the initial data signal is fed through the summing amplifier and is not summed with a signal through line 48, to establish the full magnitude of the input data signal.

Figure 3:
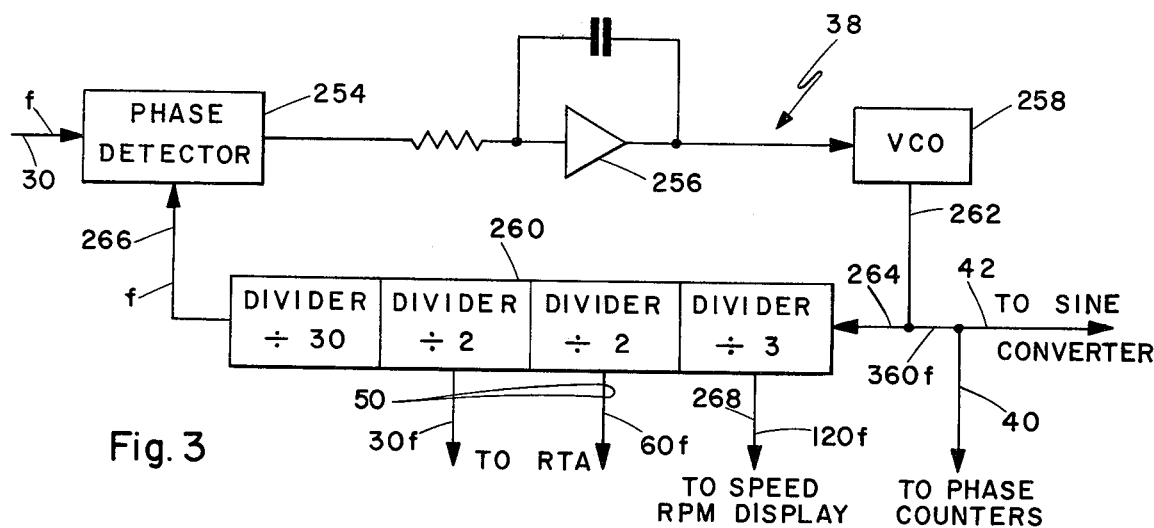
FIG. 3 is a block diagram of the phase lock loop and multiplier circuit of FIG. 1.

The phase lock loop and multiplier circuit 38, see FIG. 3, provides phase coherent frequency signals that are multiples of the input frequency, to appropriate portions of the circuit. It is necessary that the tach signal and the input data signals be phase coherent. The phase lock loop and multiplier 38 comprises a phase detector 254 that receives the input tach signal F through line 30 and supplies the F tach signal through an operational amplifier 256 to a voltage controlled oscillator 258. VCO 258 provides a 360F output signal through line 262 and line 42 to the sine converter circuit 44, through line 40 to the phase counters 116, and through line 264 to a series divider circuit 260. The first divider circuit divides the 360F to 120F that is supplied through line 268 to the speed RPM display 270. The second divider circuit provides a 60F signal to the RTA 52 and the third divider circuit also provides a 30F signal to the RTA 52 and the fourth divider circuit divides the remaining signal to F frequency that is fed through line 266 to the phase detector 254 to provide the phase lock loop.

Figure 4:
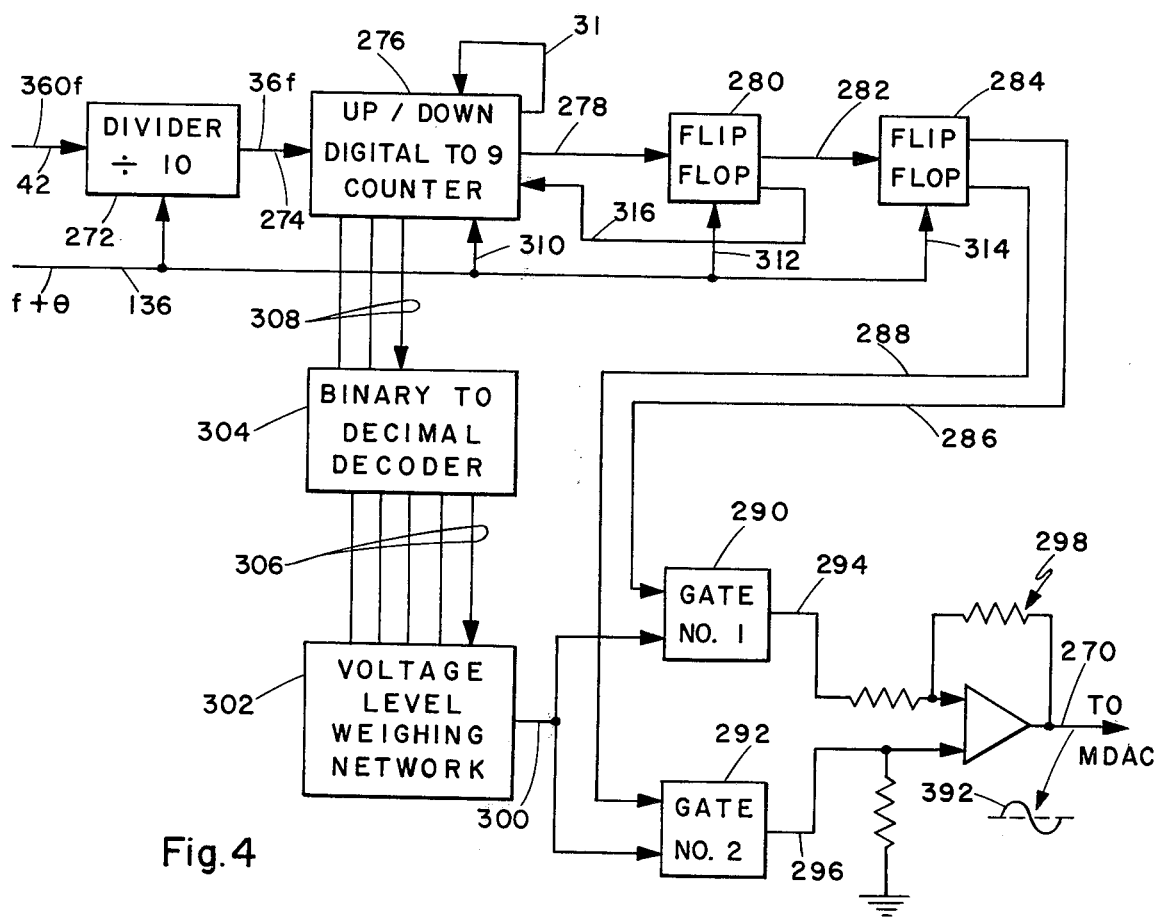
FIG. 4 is a block diagram of the sine converter circuit of FIG. 1.

In sine converter 44, see FIG. 4, the 360F signal is divided by a divider 272 to 36F that is fed through line 274 to the UP/DOWN digital to 9 counter 276. The 36F corresponds to the four 9 count steps that are required to digitally generate the synthesized sine wave, see FIG. 10, as will be described in more detail hereinafter. When the UP/DOWN counter 276 receives the input 36F frequency pulses, it counts up 9 counts. This digital output information is fed through lines 308 to the binary to decimal decoder 304. The decoded information is fed through lines 306 through a voltage level weighing network 302 to provide a step output to line 300. The counts are decoded by the decoder 304 that successively energizes network circuits in network 302, that comprise resistor outputs in a serial resistance ladder circuit, to provide levels of successive additive steps in decreasing amounts for the time intervals determined by the input frequency signal. These step level outputs pass through either of gates 290 or 292 to the operational amplifier 298 that provides the synthecized sine wave 390.

The UP/DOWN counter 270 first counts up on being reset through line 136 and line 310. Flip-flops 280 and 284 are reset by a reset signal in lines 312 and 314. When the UP/DOWN counter 276 reaches a 9 count, then the counter 276 supplies an output pulse through line 31 resetting the counters to count down 9 counts. This takes the network 302 back down through the 9 counts and supplies the step output signals through line 300. In initial reset, flip-flop 284 provides an output condition in line 286 that opens gate 290 to pass the signals from line 300 to output line 294 to operational amplifier 298 that provides the amplified output signal to line 270. In the first two sets of 9 counts, the weighted output of network 302 provides the upper half of the sine wave 290. When the UP/DOWN counter 276 counts out the second 9 counts, the counter provides an output signal through line 278 that changes the output condition of flip-flop 280. This supplies a new condition pulse through line 282 that changes the output condition of flip-flop 284 that closes gate 290 and opens gate 292 through line 288. Flip-flop 280 also supplies a reset pulse through line 316 that conditions the UP/DOWN counter 276 to again count up 9 counts. In this up count of counter 276, the decoder 304 and network 302 again provide the weighted signals to output line 300. However gate 292 is now open and the output signals pass through line 296 to the ground side of the operational amplifier 298 providing an inverted output to line 270 that forms the lower half of the synthesized sine wave 292, as previously described.

Figure 10:
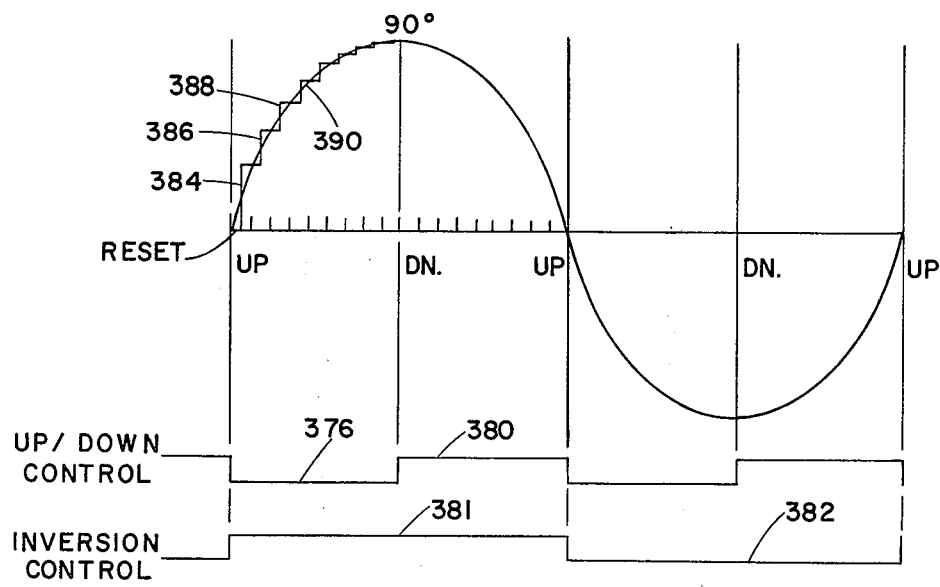
FIG. 10 is a schematic diagram illustrating the generating of a synthesized sine wave by the sine converter of FIGS. 1 and 4.
Figure 11:
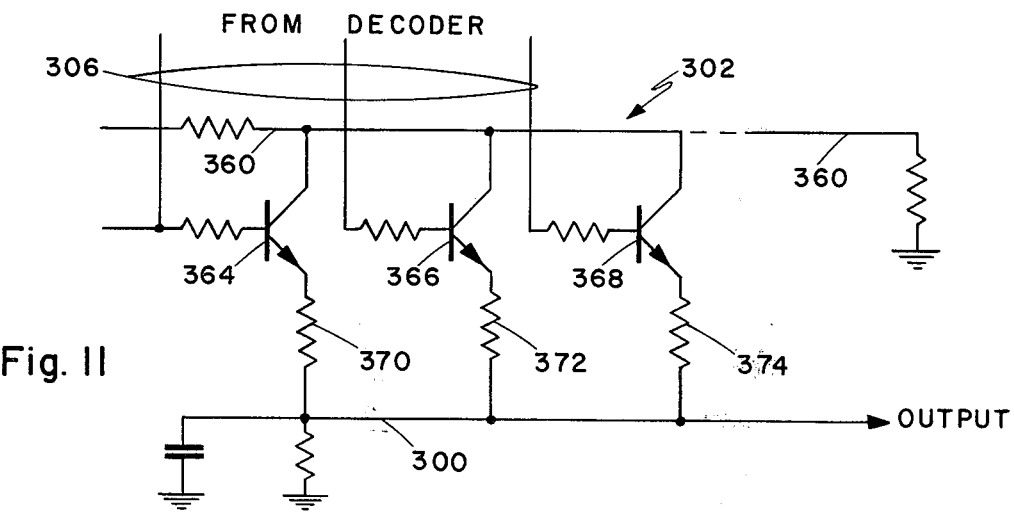
FIG. 11 is a schematic diagram of the voltage level weighting network of the sine converter circuit of FIG. 4.

The voltage level weighing network 302, see FIG. 11, comprises a power input line 360 and a grounded output line 300. Connected across this line are a plurality of exemplary transistor switching circuits 364, 366 and 368. Input lines 306 from decoder 304 successively energize the transistor switches 364, 366 and 368 through the respective base circuits 1, 2 and 3. Resistors 370, 372 and 374 form the resistance latter weighing circuits that set the output amplitudes for generating the sine wave signal. Each of the respective resistances 370, 372 and 374 become successively smaller, thus increasing the voltage magnitude outputs that, referring to FIG. 10, provide the respective outputs 384, 386 and 388 of lines 300 to establish step level increases that form the sine wave 390. During the up count of the UP/DOWN counter 376, gate no. 1 is open corresponding to tuning level 318 and during the second half or down half of the cycle, gate no. 2 is open corresponding to timing level 382. In turn the UP/DOWN counter counts up and counts down at appropriate quarter cycle intervals established by timing steps 376 and 380. Thus a sine wave is synthesized digitally with a start time corresponding to the time that the sine converter 44 receives an input reset signal F+θ in line 136. θ is the measured phase shift of the input data signal received in line 16 relative to the tach input signal 18. Since wave 390 is then fed through line 270 to the MDAC 46. MDAC 46 is a known multiplying digital to analog converter circuit that is digitally controlled to give the sine wave 290 a given amplitude. Thus the sine wave having the controlled magnitude set by MDAC 46 is then supplied through line 48 to the summing amplifier 24. One of the objects of the circuit is to provide a sine wave signal having the amplitude and phase that when inverted, balances out the input data signal in line 23 so that the output amplitude signal supplied through line 54 to the RTA 52 is balanced out. This phase θ and the amplitude to the MDCA 46 is then read out in the respective phase display 118, amplitude display 126 and the speed RPM display 270 to provide that information required to trim balance the rotating mechanism. Referring to FIG. 9, diagram *a*, if sine wave 317 is the input data signal and dotted line 319 is the synthezised signal of the sine converter 44, then balance is achieved when the two signals are 180° out of phase.

Figure 7:
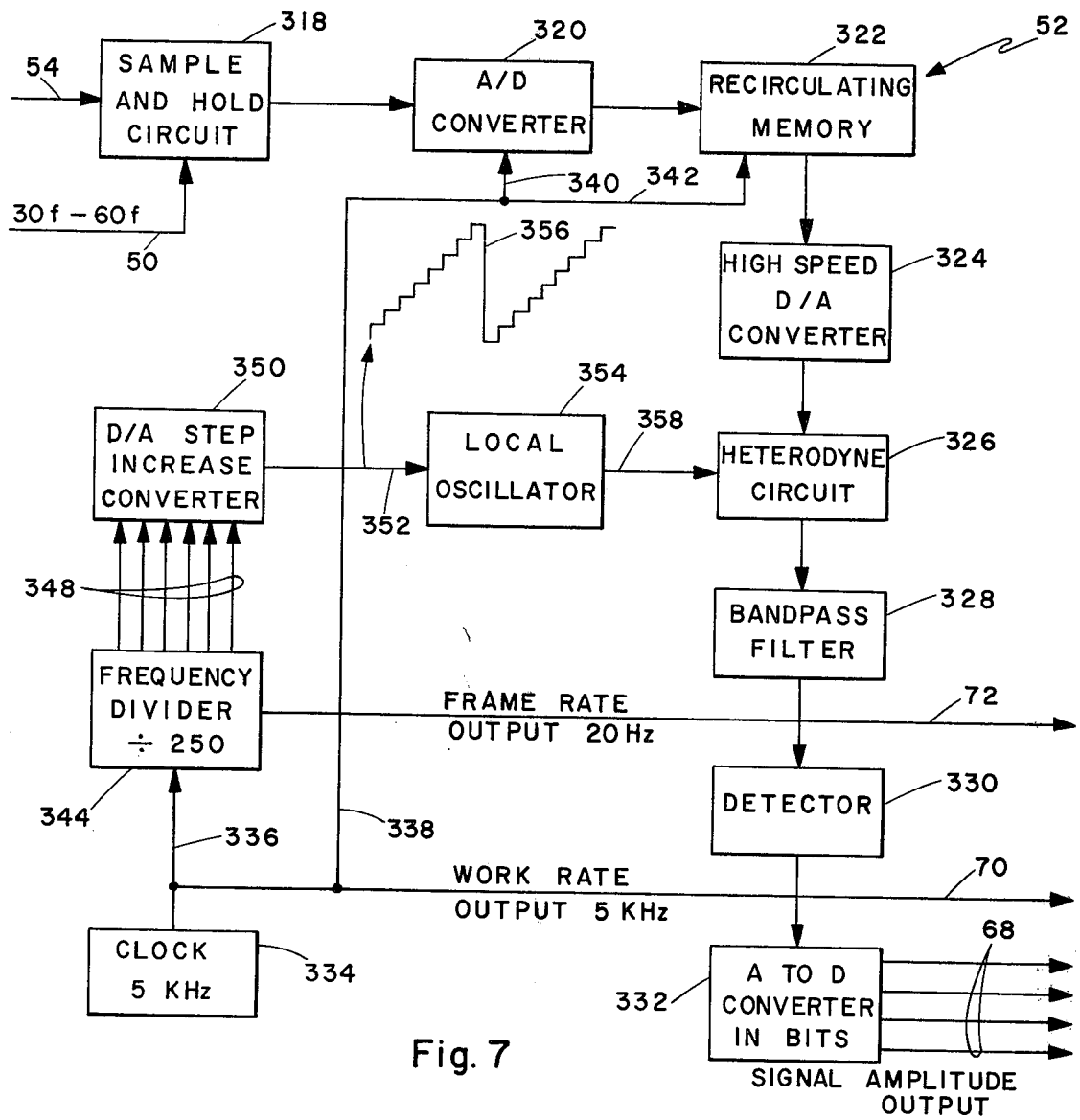
FIG. 7 is a block diagram of the real-time analyzer circuit of FIG. 1.

The data signal is fed from the summing amplifier 24 through line 54 to the real time analyzer 52. In the RTA, FIG. 7, the input data signal is fed through line 54 to a sample and hold circuit 318. This sample and hold circuit 318 is clocked at the 30F or 60F frequency signal. The sample and hold circuit 318 samples the data signal and feeds this data signal to the A to D converter 320 that converts the analog input signal to a digital signal at a given clock frequency. For purposes of explanation of this embodiment, the basic clock frequency is 5KH$_z$ and is supplied by clock 334 through lines 338 and 340 and 342. The digital output data signal from the A to D converter 320 is fed to the recirculating memory 322 that recirculates the input data signal in a compressed time sequence in digital form, at the 5KH$_z$ recirculating speed. Thus the input data signal is compressed to a time recirculation of 200 microseconds. This output signal is then fed to the high speed digital to analog converter 324 and the output analog signal is fed to the hetrodyne circuit 326 where it is beat with a local oscillator signal received through line 358 from local oscillator 354.

The clock signal source 334 feeds a 5KH$_z$ signal output through line 336 to a frequency divider and counter 344 that in the illustrative embodiment, divides the 5KH$_z$ signal by 250 providing a series of output pulses to the D to A converter 350 having a frequency of 20 H$_z$ and an increasing digital number. The D to A converter 350 converts this digital signal to an increasing analog signal 356 that has 250 - 20H$_z$ steps, that drive the local oscillator 354 to successive stepped increases in frequency, proportional to the increase in voltage of the output signals of the D to A converter 350 in line 352. Thus the local oscillator 354 provides a plurality, in this embodiment 250, step increases in frequency with each frequency step having a time interval of 200 microseconds. At the end of each set of 250 output steps, the D to A converter 350 recycles dropping the input voltage to the local oscillator 354. This provides an output of a group of 250 step frequencies for each time that the recirculating memory 322 recirculates the input signal to the D to A converter 324 and the hetrodyne circuit 326. The recirculating memory 322 provides the full input signal sample to the hetrodyne circuit 326 each 200 microseconds, which is hetrodyned with each step of the local oscillator signal. So each signal sample of the input signal in the input memory 322 is interrogated over 250 step frequencies. Band pass filter 328 filters the output signal of the hetrodyne circuit and detector 330 detects the amplitude of the signal, providing an analog output that is the spectrum output. The detector 330 feeds the analog amplitude data to the A to D converter 322 that converts the analog signal to digital bit information. Line 72 provides the frame rate output signal of 20 Hz to the word counter circuit, see FIG. 1, and line 70 supplies the word rate output of 5 $KH_z$, in this illustrative embodiment, the word counter circuit 62 of FIG. 1.

The real time analyzer circuit 52 normally has an operational frequency range setting of one-third of the sampling frequency. Thus, for example, if the input frequency signal of interest is $500H_z$, then the sampling frequency is 30 times 500 to equal $1,500H_z$. Since the input frequency sampling rate is 30F, and full scale is one-third of the sampling frequency of 3 times F, then the input frequency will always be one tenth of full range. Since the sampling rate is 250, then one tenth of full scale is 25. So for each frame rate of 25 word rate outputs, the signal of interest output of the RTA 52 will always be the 25th word. Where, for example, it is desired to use a $10KH_z$ clock signal from clock 334 in the RTA, then the 60 F sampling rate will be the sampling rate supplied at line 50 to the sample and hold circuit 318.

The circuit operates to determine the magnitude of the fundamental of the unbalanced signal and indirectly determines the phase lag of the unblanced signal relative to the tach signal by magnitude nulling. This phase lag in relation to the 360° rotational movement of the rotating machinery, gives the location of the unbalance. Weights can then be appropriately applied to the rotating machinery to balance out the unbalance that gives the unbalanced signal. Referring to FIG. 1, the sine converter 44 generates a synthesized sine wave, the amplitude of which is set by the MDAC 46. F + θ phase lag pulse from the phase counters 116 initiates the start of the sine wave. Thus the angle phase represents a phase lag with respect to the reference tachometer signal. This angle is adjusted by the phase counting circuit 116 based upon the output of the slop detector circuit 94, see FIG. 1. The phase counting circuit produces a carry pulse (F + θ) that would be in phase with the tachometer signal F if there were no phase difference between the unbalanced signal and the tachometer signal, that is, would be zero. The sine wave produced would thus be in phase with the tachometer signal and would inherently null the unbalance signal. But, where there exists a phase difference between the unbalanced signal and the referenced tachometer signal F, the carry pulse must then be adjusted to lag the tachometer signal F, thus shifting the phase of the sine wave. The amount of lag will be adjusted by the phase counter circuit 116 to produce a sine wave that nulls the unbalanced signal. The amount of phase lag required in degrees will be displayed by the phase display indicator 118. The magnitude to achieve a null is determined by monitoring the digital spectrum data from the RTA 52.

In initially determining the magnitude of the input unbalanced signal, the input data signal is fed through line 54 to the real time analyzer 52. The real time analyzer provides the digital magnitude of the input signal through lines 68 to the peak detector 66. As previously described, the RTA 52 output provides the data signal at or near the 25th word. Thus the word counter 62 functions to control the peak detector to receive the 24th, 25th and 26th words from the RTA 52, and thus receive the full magnitude of the input data signal.

Figure 2:
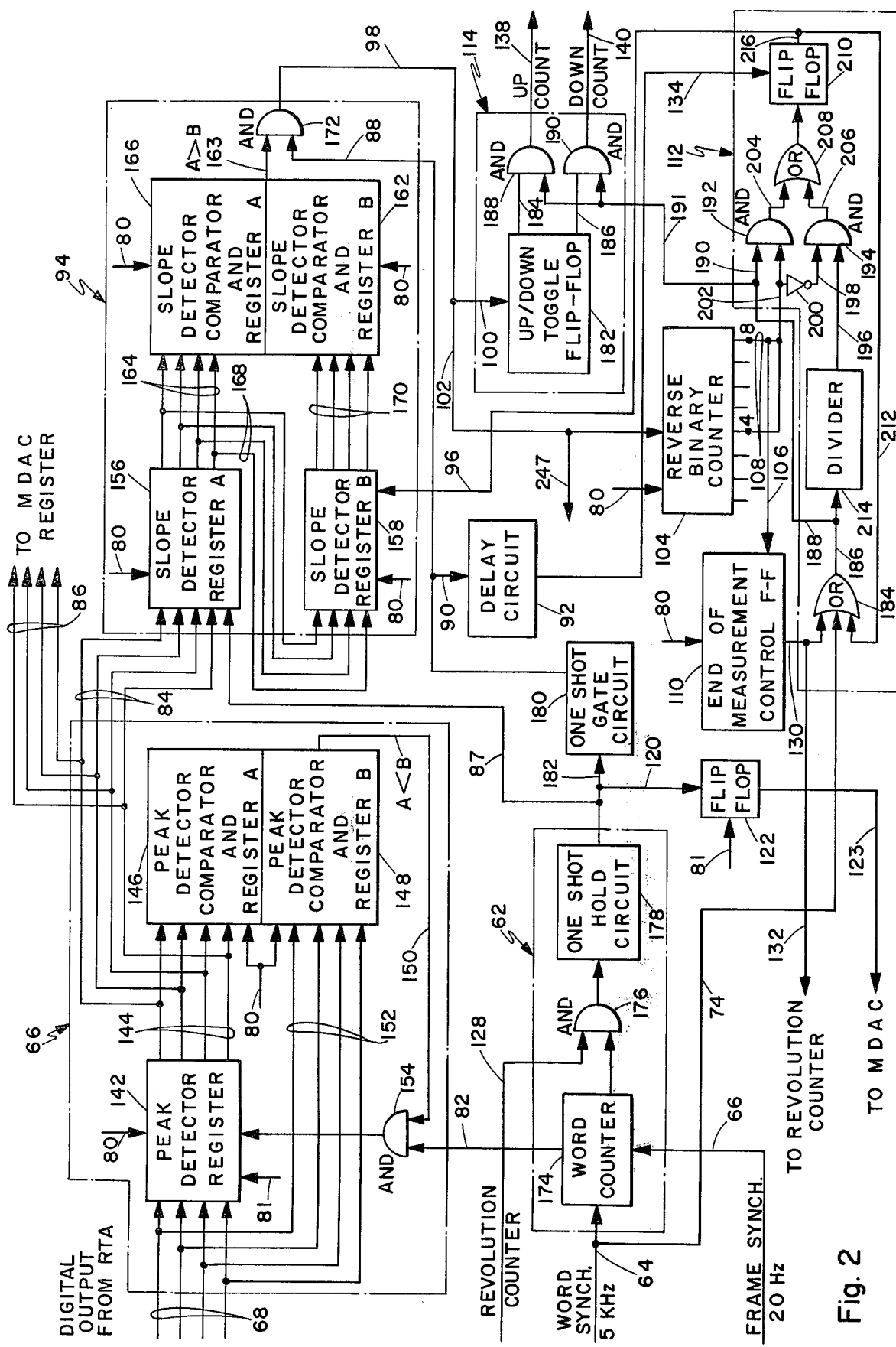
FIG. 2 is a block diagram of the portion of the electrical circuit of FIG. 1 for receiving information from the real-time analyzer and for determining the output phase correction information.

Referring to FIG. 2, the word sync pulses are supplied through line 64 to the word counters 174. The word counter 174 is reset by the frame sync pulse through line 66. After being reset, the word counter 174 counts each word sync pulse and provides output count pulses on the 24th, 25th and 26th words through line 82 to the AND gate 154. The output of AND gate 154 resets the peak detector register 142 to receive the digital output data from the RTA 52 from lines 68. The initial function of the peak detector is to provide an output to the MDAC register that is the peak magnitude of the RTA for words 24, 25 and 26. When receiving the 24th word digital information from the RTA 52 the peak detector 66 feeds the information through lines 152 to the peak detector comparitor and register B 148. Peak detector register B 148 compares this digital information with that digital information in peak detector comparitor register A 146. If the digital number in peak detector register B is larger than that in peak detector register A, then an output signal is supplied through line 150 AND gate 154. This output signal in coincidence with the pulse from word counter 174 in line 182 enters the digital information into peak detector register 142 that in turn supplies the digital word information through lines 144 to the peak detector register A.

Figure 12:
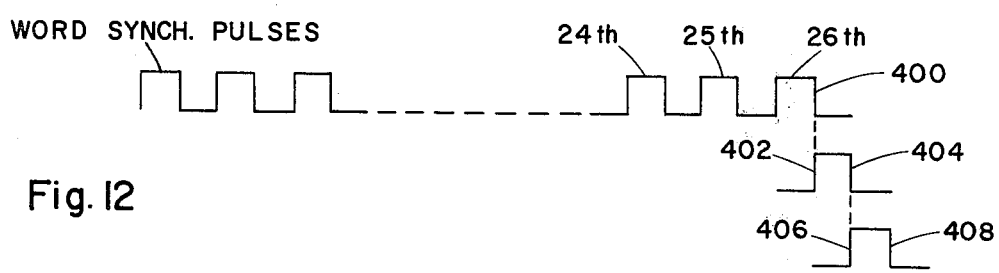
FIG. 12 is a diagram of the timing of the word sync pulses at the word counter circuit of FIG. 1.

In this initial operation, since there is no digital information in a peak detector register A, the initial information in peak detector register B is greater than that in the A register. The word counter 174, in response to the word sync pulse in line 64, supplies the 25th word sync pulse through line 82 and AND gate 154. At the same time, a new digital data word is received from the RTA 52, corresponding to the 25th word, in the peak detector register 142. This digital data is also fed through lines 152 to the register B 148. If the data of the 25th word in register B is greater than the previous 24th word that is in register A, then a pulse is supplied through line 150 gating gate 154 and passing the 25th word data information into the peak detector register 142 and through lines 144 to the peak detector register A. This sequence is then repeated for the 26th word. In normal operation, the peak data will be in the 25th word and thus no output pulse would normally be passed through line 150 to gate AND gate 154 in receiving the digital data information corresponding to the 26th word pulse. So at the end of the 26th word, the peak digital magnitude of the input data sequence for words 24, 25 and 26 is in the peak detector register A 146 and is in lines 144. This data information is also supplied through lines 84 to the slope detector register A 156 and through lines 86 to the MDAC register 124. The MDAC register 124 feeds this information to an appropriate decoding amplitude display 126 that displays the amplitude of the input data signal. Additionally this digital information is fed through line 125 to the MDAC 46 for setting the appropriate magnitude of the sine wave received from the sine converter 144 that is fed through line 48 to balance out the data signal in the summing amplifier 24, when the appropriate null phase relationship of the synthesized since wave of the sine converter is determined by the $F + \theta$ balancing phase lag signal from the phase counters 116. The MDAC register 124 only registers that input data signal received during the first phase of operation of the circuit. Thus the word counter puts out a pulse 402, see FIG. 12, at the trailing edge 400 of the 26th word sync pulse. Flip-flop circuit 122, responsive to the trailing edge 404 of pulse 402, changes its condition to supply a pulse through line 123 that inhibits the MDAC register 124 from receiving any further digital data through lines 86 until the flip-flop 122 and MDAC register 124 are reset by reset pulses through line 80. The output pulse 402 is supplied by the one shot hold circuit 178. This output pulse is also supplied through line 87 to the slope detector register A 156 that triggers the registers to receive the digital data in lines 84, that is the largest data signal of the input information sequence received by the peak detector from the RTA for the word sync pulse sequence.

The initial operation is to determine the magnitude of the input data signal and to set the MDAC register 124 and MDAC 46. Thus after this operation, the peak detector slope detector and registers are reset. Then a new input signal is fed to the slope detector from the RTA 52 in the same manner as previously described. This input signal also sets the slope detector 94 for making phase and balance determinations. The slope detector 94 comprises register A 156 and register B 158 and a comparator circuit comprising slope detector comparator and register A 166 and slope detector comparator and register B 162. In operation, the data from slope detector register A is fed through lines 164 to register A 166. This digital data is compared with the data in slope detector register B 162. If the data in register A 166 is larger than that in register B 162, then a high or yes output signal is supplied through AND gate 172 to line 98. Slope detector register B registers the digital information in lines 164 received through line 168 and feeds this information through lines 170 to slope comparator register B 162 for the subsequent commparison.

Since in initial operation there will be no information in the reset register B 162, there will be a high output pulse through line 163 to AND gate 172. The one shot gate circuit 180 is responsive to pulse 402 in line 182 from the one shot hold circuit 178 and supplies a control pulse 406 through line 88 to AND gate 172. Thus AND gate 172 is enabled after the appropriate gate information is stored into register A 166 and register B 162 so that the appropriate comparison can be made. AND gate 172 provides an output high or yest signal to line 98 when A is greater than B and a low or no signal when A is smaller than B. This information is fed through line 100 to the UP/DOWN toggle, flip-flop circuit 182. The UP/DOWN toggle, flip-flop circuit 182 changes its condition each time it receives a high pulse in line 100. Each change of position energizes alternatively lines 184 and 186 for purposes that will be described in more detail hereinafter. Additionally a high pulse is fed through line 102 to the reverse binary counter 104. The reverse binary counter 104 only counts high pulses and provides output count levels on four and eight counts in lines 108. In the zero to four counts, line 108 is low. In the four to eight counts, line 108 is high, so initially in the zero to four counts, lines 108 and 102 are low so AND gate 192 is closed, while through inverter 200 line 298 is high and gate B 194 is open. After four high counts are received line 108 becomes high for the next four counts and thus gate 192 is open and gate 194 is closed.

Figure 6:
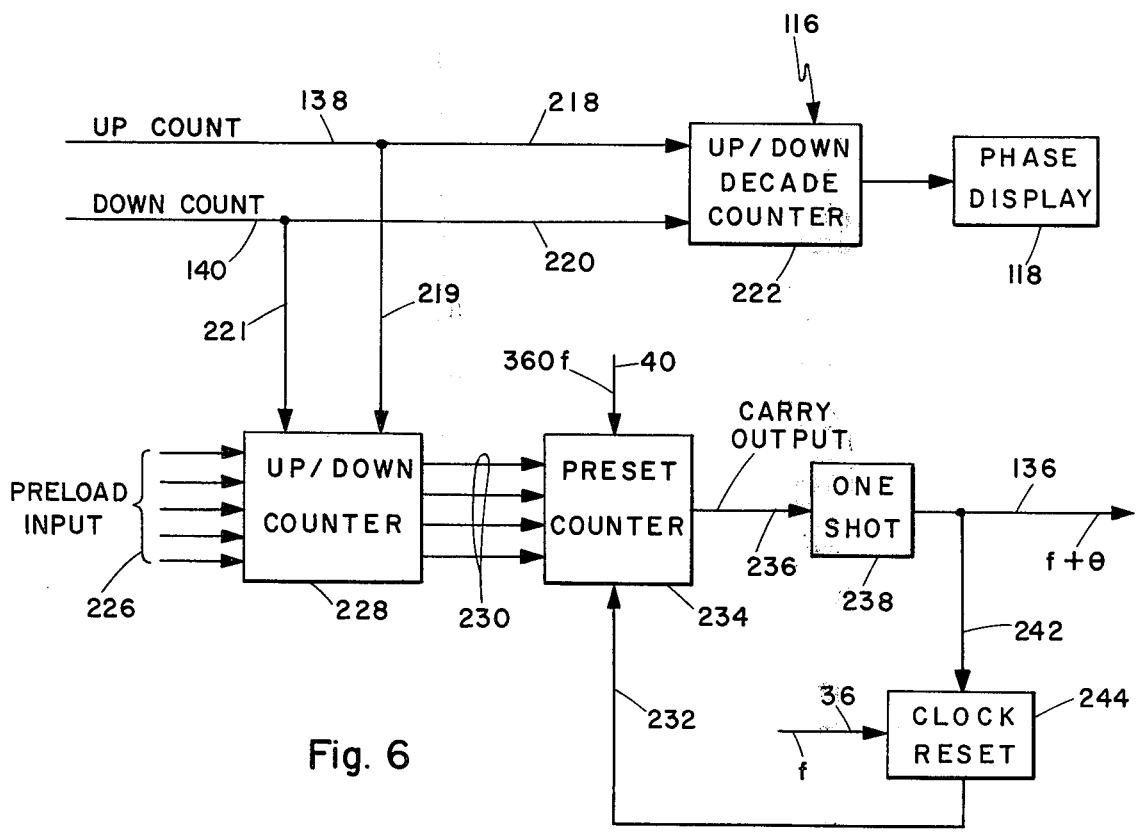
FIG. 6 is a block diagram of the phase counter circuit of the circuit of FIG. 1.

In this initial operation, gate 194 is conditioned to pass pulses received through line 196 and pass these pulses through line 206 and through OR gate 208 to the flip-flop 210. The word sync pulses from the RTA in line 64 are fed through line 74 to OR gate 184. At this time flip-flop 210 is in a first condition wherein line 216 has a low output and thus line 212 to the OR gate 184 is low. The end measurement control flip-flop 110 output to line 130 is also low. Thus the five $KH_z$ word sync pulses are fed through the OR gate 184 and through line 186 to divider 214. Divider 214 divides the pulses by ten and provides a one for ten pulse after through line 196 to enabled gate 194 and through line 206, gate 208 to flip-flop 210. Flip-flop 210 is then changed to its second condition providing a high output through line 216 and 212 that inhibits OR gate 184 from passing any further word sync pulses. The ten received word sync pulses are simultaneously fed through line 188 and line 191 to the respective AND gates 188 and 190 of the UP/DOWN toggle and gate circuit 114. This provides a ten pulse count through gate 188 or gate 190 and up count line 138 or down count line 140 to the UP/DOWN counter 228 of the phase counter circuit 116, see FIGS. 2 and 6.

The phase counter circuit 116 functions to count word pulses from the RTA 52 in phase coherence plus a phase shift with the tach signal, until the sine wave produced by the sine converter 144 is the correct phase with fundamental of the input data signal to null the data signal in the summing amplifier 24. While the input word sync information establishes phase lag or lead, the count information is sequenced in response to the 360F signal received through line 40 from the phase lock loop and multiplier system 38.

The UP/DOWN counter 228 and the preset counter 234 have a count capacity of 512. The UP/DOWN counter 228 has an initial preset count from lines 226 of 360+152. This count of the UP/DOWN counter 228 is loaded through lines 230 into the preset counter 234. The count in the UP/DOWN counter is continually being changed by count pulses received from lines 138 and 140. For example, in initial operation the high output of the UP/DOWN toggle flip-flop 182 through line 184 gates AND gate 188 allowing the ten word sync pulses to pass through line 191, line 138 and line 219 to the counter 228. This causes counter 228 to count down ten counts. Thus the preset input in UP/DOWN counter 228 is reduced by ten counts to 502 as is the count in the preset counter 234. When counter 234 is enabled by an enable pulse through line 232, then the 360F input pulses through line 40 cause the counter 234 to count to ten counts and provide a carry output pulse through line 236 to the one shot multivibrator 238 that provides a responsive output pulse to lines 136 and 242. It may be understood, that this output pulse has a phase lag of ten counts or 10°. Thus the timing output pulse $F+\theta$ through line 136 is $F+10°$ phase lag. This output pulse in line 136 is also fed through line 242 to the flip-flop clock circuit 244. This pulse causes the clock reset 244 to provide a condition level in line 232 that inhibits the preset counter 234 from counting beyond the carry output pulse. It may be observed that when down counts are received through line 140 and through line 221, counter 228 counts up increasing the count in the preset counter 234 and thus reducing the number of 360F count pulses required to count out the present counter and provide an output signal through line 236 and line 136 thus decreasing the phase lag $\theta$ of the sine wave output of the sine converter 44.

In matching the phase of the sine wave of sine wave converter 44 with that of the fundamental of the input data signal in the summing amplifier 24, it may be understood that the slope detector only provides a high signal through gate 172 and line 98 that operates the toggle flip-flop 182, when A is greater than B. As will be described hereinafter, A is greater than B only when the phase of the sine wave of sine converter 44 has passed through or beyond the phase of the input data signal in either direction. When this occurs, this is known as a reversal. Thus the toggle flip-flop 182 condition is only changed when there is a reversal. The circuit initially operates with a high output from gate 172 causing a down count and this down count continues in UP/DOWN counter 228 until there is a reversal. With the next reversal, the UP/DOWN toggle flip-flop changes output lines and gate 190 is opened. The word sync pulses then count the UP/DOWN counter up until there is another reversal.

Figure 13:
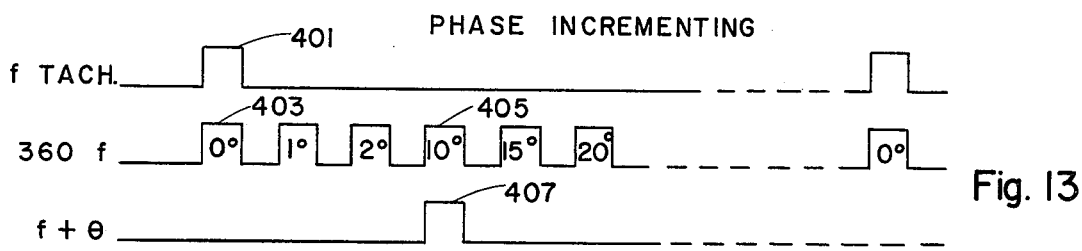
FIG. 13 is a diagrammatic illustration of the phase incrementing pulses in the phase counter circuit of FIG. 1.

Referring to FIGS. 14 and 15, the down count is in the direction of the arrow from count 512 or 0° on line 411 to count 152 or 360°. The count cannot exceed that at the dotted line corresponding to the count of 152 or 360°. As illustrated in FIG. 15, a count down is an increase in the phase lag and a count up indicates that the sine wave output of the sine converter 44 has a phase lag that exceeded the phase lag of the input signal to be nulled, causing a count reversal. By this method the phase counters bracket the phase of the input data signal. The phase incrementing to obtain the correct phase lag thus occurs by starting the count in counter 234 by an F tach pulse 401, see FIG. 13, and then counting out the degrees in 360F count pulses until the counter 234 counts out to a carry pulse providing an F+$\theta$ pulse 407 to the sine converter 44.

Returning now to the peak detectors and slope detectors of FIG. 2, the next series of digital data information received through lines 68 from the real time analyzer 52 is compared in register A 146 and register B 148 of the peak detector 66. This comparator circuit determines the largest magnitude signal of the three input digital words and feeds this digital word to the slope detector register A 156. The output of register 156 is then fed through lines 164 to the slope detector comparator register A 166 where it is compared with the previously received data signal that has been fed through line 168 and through slope detector register 158 and lines 170 to the slope detector comparator register B 162. If the digital word in register A 166 is not greater than the digital word in register B, then this indicates that the sine wave is still moving toward the null point and a count reversal is not necessary to bracket the null phase. So the phase increment counter circuit continues to function as previously described to provide ten pulse counts through line 191, through AND gate 188, up count line 138 and line 219 causing a down count in the UP/DOWN counter 228 that increases the phase lag of the synthesized sine wave balancing signal. When the synthesized phase lag passes through the null point in either direction, then A becomes greater than B and a high output signal is supplied from gate 172 through lines 98 and 102 to the reverse binary counter 104 and the UP/DOWN toggle flip-flop 182 is flipped to the new condition. This causes gate 190 to be enabled by the output in line 186 to pass the ten counts from line 191 through lines 140 and 221 to cause the UP/DOWN counter to count up, thus presetting the preset counter 234 with a larger count and reducing the count pulse required to count out the preset counter 334, and thus decreasing the phase lag $\theta$ of the synthesized sine wave signal.

Until there are four reversals received by the reverse binary counter 104, each of the counts processed by the phase increment counter are in the form of ten counts, corresponding to 10° increments of phase shift. After there have been four reversals, then the reverse binary counter provides a high output signal through lines 108 that enables AND gate 192 and inhibits AND gate 194. Gate 184 then passes word sync pulses from line 74 through line 186, line 188 and line 190, through AND gate 192 and line 204 and through OR gate 208 changing the condition of flip-flop 210. Thus after receiving a single pulse, flip-flop 210 supplies a high output through lines 216 and 212 inhibiting OR gate 184. Only a single pulse is then supplied through line 191 and through the appropriate AND gates 188 or 190. So the UP/DOWN counter and preset counters are moved in one degree increments until there have been four reversals through the slope detector 94. This allows the phase counters to bracket the correct phase lag by ten degree increments through four reversals, and by one degree increments through the next four reversals. When reverse binary counter 104 received eight high pulses, it supplies an output pulse through line 106 to the end of measurement control flip-flop 110. This provides a change in level output through line 130 that inhibits OR gate 184 effectively de-energizing the phase increment counter 112. The circuit by this time has established the correct phase shift, and has shifted the phase of the sine wave of the wine wave converter 44 sufficiently to balance out or null out the input data signal in the summing amplifier 24, as reflected in the output line 54 to the real time analyzer 52 and the input data signals in lines 68 to the peak detector and slope detector circuits. This output count for $\theta$ is reflected in the phase display 118. Lines 218 and 220, provide appropriate up and down counts in a decade counter 222 that is read out in the known manner in phase display 118 to provide the appropriate numerical phase in degrees. Thus the speed RPM display 270, the amplitude display 126 and the phase display 118 provide that information required to balance the rotating mechanism.

The initial operation of the circuit is started by an operating input pulse that may be manually or electrically supplied through line 78 to FIG. 1, to an initialize pulse generator 76 that provides output reset pulses through line 80 that resets the appropriate circuits, such as the MDAC register 124, the UP/DOWN toggle and gates 114, reversal counter 104, slope detector 66, end of measurement control 110, and the phase counters 116.

Figure 5:
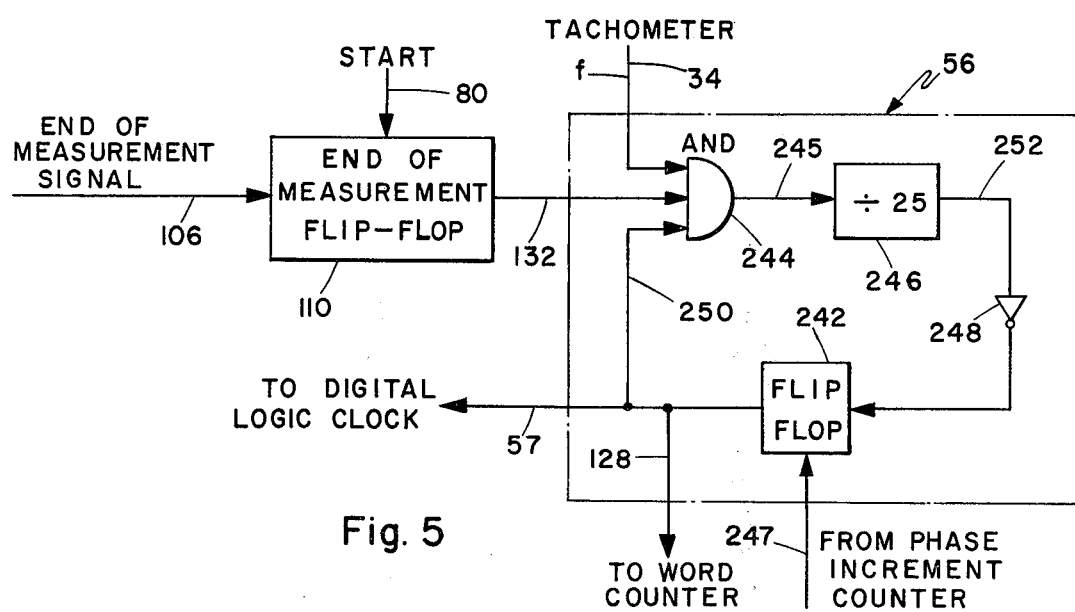
FIG. 5 is a block diagram of the revolution counter circuit of FIGS. 1 and 2.

The revolution counter 56 and the digital logic circuit 58 control the timing of the circuit operation and provides a nonoperation spacing between recycling for an interval of 25 revolutions of the rotating machinery being tested, to provide time for input of data information into the real time analyzer 52 and the settling of the circuit. The rotation counter circuit 56, see FIG. 5, has a control AND gate 244. The end of measurement flip-flop circuit 110 normally provides a high output level in line 132 to AND gate 244 as does flip-flop 242 in line 250. The tachometer frequency F is ssupplied through line 34 to AND gate 244 and provides count pulses in line 245 to divider circuit 246. Divider circuit 246 provides an output pulse for every 25 counts, which output pulse passes through inverter 248 to change the output condition of the flip-flop 242. This provides an inhibiting level in line 250 closing AND gate 244 and supplying digital logic output pulse in line 57 to the digital logic clock circuit 58 that supplies clock pulses through line 81. These clock pulses provide the digital logic to the circuit required to provide the 25 revolution spacing.

In operation of the revolution counter circuit 56 and the phase increment counter 112 the condition of flip-flop circuit 210 is controlled by the input word sync pulse 26 through line 90, delay circuit 92 and line 134. Delay circuit 92 provides only that delay necessary to assure correct prior sequencing of the register information through AND gate 172 to the reverse binary counter 104. When flip-flop 210 changes its condition inhibiting OR gate 184, it also supplies an output pulse through line 247 to the revolution counter circuit and specifically to flip-flop 242. This changes the output of flip-flop 242 to the digital logic clock 57 when the output of the digital logic clock inhibits the operation of the remainder of the circuitry, including peak detector 142, slope detector 94, phase counters 106, phase lock loop and multiplier circuit 38 and sine converter 44. After the 25 tachometer revolutions have passed through divider 246 and flip-flop 242 is then flipped back, the digital clock 57 then provides an output digital signal to the appropriate circuits allowing a new operation cycle to proceed. When the end of measurement flip-flop 110 has received a pulse through 106, then its output 132 goes low, inhibiting AND gate 244 and thus de-energizing signals to the digital logic clock, and ceasing operation of the circuit until operation is again initialized through the initialized pulse generator 76.

The pulse supplied to the revolution counter 56 also corresponds with the pulse supplied through line 96 from the phase increment counter 112 to the slope detector register B 158 that loads slope detector register B and the slope detector comparator and register B 162. This provides the delay sequence for preparing the slope detector for the next sequence, and after the largest signal in the peak detector has been detected. Also this is after gate 172 of the slope detector has gated the output signal to the reverse binary counter 104. The revolution counter 56, at the end of measurement provides an output signal through line 128 inhibiting gate 176 and preventing further operation of the slope detector, phase increment counter, or the loading of the MDAC register.

The timing chart of FIG. 16 shows the timing of the circuit. The initialized pulse is that provided by the pulse generator 76. End of measurement pulse is the condition of output line 132 to the revolution counter and OR gate 184 of the phase increment counter 112. The revolution counter pulses are the 25F delay to the digital logic 58. The clear detector pulse is the pulse from the digital logic 58 that clears the peak detector circuit 66 for a subsequent receiving of peak information from the RTA 52. The frame sync pulse and the word sync pulse are those previously described relative to FIG. 12. The load slope detector register A pulse is that from the one shot hold circuit 178 to line 87. The sample slope gate pulse is that from the one shot gate circuit 180 through line 88 to AND gate 172. The reversal counter pulse is that received by the reverse binary counter 104 and the enable phase increment counter pulse is that received through delay circuit 92 and line 134 that resets flip-flop 210. The increment counter output are the word sync pulses received through line 74 that pass through OR gate 184 to the UP/DOWN AND gate 188 and 190. The load B register slope detector with contents of A is the output of the flip-flop 216 of the phase increment counter through line 216 and line 96 to slope detector register B 158.

Having described my invention, I now claim:

1. A system for locating the unbalance and determining the signal phase of vibration data signals relative to tachometer point signals of a rotating member comprising,
   means for determining the amplitudes of the unbalance signals of the vibration data signals and providing amplitude output signals,
   means responsive to said amplitude output signals and the tachometer point signals for synthesizing balancing signals having the frequency of the tachometer point signals and the amplitude of the unbalance signals,
   means for nulling the balancing signals and the unbalance signals and providing summing output signals representative of the phase difference,
   means responsive to the summing output signals for shifting the phase of the synthesized balancing signals to null the unbalance signals in said nulling means,
   and means for determining the phase of the nulling synthesized balancing signals relative to the tachometer point signals.

2. A system as claimed in claim 1 wherein,
   said balancing signal generating means including sine converter means for generating synthesized balancing signal sine waves.

3. A system as claimed in claim 1 including,
   means for determining the magnitude of the unbalance signals.

4. A system as claimed in claim 2 wherein,
   said sine converter means comprising a digital sine wave generator that digitally generates the balancing signal sine waves.

5. A system as claimed in claim 4 wherein,
   said balancing signal generating means including an MDAC circuit responsive to said amplitude output signals for setting the magnitude of said balancing signal sinewaves to the magnitude of the unbalance signals.

6. A system for locating the unbalance and determining the signal phase of vibration data signals relative to tachometer point signals of a rotating member comprising,
   means for determining the amplitudes of the unbalance signals of the vibration data signals and providing amplitude output signals,
   means responsive to said amplitude output signals for generating balancing signals having a frequency of the tachometer point signals and the amplitude of the unbalance signals,
   means for nulling the balancing signals and the unbalance signals and providing summing output signals, means for shifting the phase of the balancing signals to null the unbalance signals in said nulling means, means for determining said shifted phase, said balancing signal generating means including sine converter means for generating balancing signal sine waves, means for providing tach signals that are phase coherent with the tachometer point signals and the unbalance signals and phase pulses that are phase coherent with the tach signals, said phase shifting means including analyzer means responsive to said tach signals and said summing output signals for providing a plurality of analyzer output signals the amplitude of which increase and decrease with the amplitude of said summing output signals, detector means for detecting the amplitude of particular output signals of said analyzer means, said detector means including means for determining changes and no changes in amplitude of said analyzer output signals and providing a given number of output pulses depending upon the changes in the amplitude, phase counters for receiving said detector means output pulses as pre-load counts, and means for feeding said phase pulses into said phase counters for counting out said phase counters providing a carry pulse to said sine converter means at a timing that sets said shifted phase.

7. A system as claimed in claim 6 wherein, said detector means repetitively providing count up and count down pulses to said phase counters in response to changes in amplitude of said analyzer output signals to preset said phase counters to provide said carry pulse at the phase of the unbalanced input signals.

8. A system as claimed in claim 7 wherein, said detector means including slope detector means responsive to changes in the amplitude of said analyzer output signals responsive to phase shifting the balancing signals for detecting the balancing signals passing through the phase of the unbalanced signals and providing count up or count down pulses to said phase counters bracketing the phase of the unbalance signals relative to said tach signals.

9. A system as claimed in claim 7 wherein, said analyzer means providing digital word outputs for said analyzer output signals to said detector means, said detector means including peak detector means for detecting the peak amplitudes of digital words received from said analyzer means and providing peak work outputs, word counter means for counting words received from said analyzer means providing an initiating signal to said peak detector means to receive a given sequence of words from said analyzer means, and slope detector means for receiving the peak word outputs and comparing the peak word outputs providing count up or count down count pulses to said phase counters in response to said comparisons.

10. A system as claimed in claim 9 wherein, said balancing signal generating means including register means for storing the peak word from said peak detector means of a series of words received from said analyzer means, means for setting the amplitude of said balancing sine wave to the amplitude of said peak word, and means for inhibiting said register means from responding to peak words from said peak detector means until being reset.

11. A system as claimed in claim 10 wherein, reversal counter means for counting the number of reversals in count up or count down count pulses to said phase counters from said slope detector means, and means responsive to said reversal counter means counting a given number of reversale for providing a signal that inhibits said peak detector means from detecting further words from the analyzer means until reset.

12. A system as claimed in claim 6 wherein, said sine converter means including digital counter means responsive to said tach signals for providing a given number of digital up counts and digital down counts, decoder means for decoding said digital up and digital down counts into a series of output pulses, and means including a voltage level weighing network that provides increasing or decreasing output voltages in response to the series of output pulses, for converting said output voltages into substantially a sine wave.

13. A system as claimed in claim 12 wherein, said digital counter means being initiated into counting operation in response to said carry pulse signal received from said phase counters.

14. A system as claimed in claim 6 wherein, said phase shift determining means having display means for displaying said phase shift in degrees.

15. A system as claimed in claim 14 including, means for displaying the amplitude of the unbalance signals.

16. A system as claimed in claim 9, including, means for setting the range of said analyzer means to provide the analyzer output digital words incorporating the amplitude of the summing output signals at a given word count for each operation sequence.

17. In a method for developing balance information for an unbalanced rotating member from tachometer point signals and vibration pickup unbalanced signals, where the phase difference of the unbalanced signals to the tachometer signals establishes location of the unbalance, comprising the steps of, determining the amplitude of the unbalanced signals, generating balancing signals that are frequency and phase coherent with the tachometer point signals and have the amplitude of the unbalanced signals, shifting the phase of the balancing signals to null the unbalance signals in a summing device, and determining the phase of the balancing signals relative to the tachometer point signals that nulls the unbalanced signals giving the phase shift location of the unbalance.

18. The method as claimed in claim 17 including the steps of, generating sine waves as the balancing signals.

19. The method as claimed in claim 18 including the steps of, summing the balancing signal and the unbalancing signals in a summing circuit, detecting the outputs of the summing circuit for increases or decreases in the amplitude of said outputs, providing output pulses corresponding to increase or decrease changes in said amplitudes, and counting said output pulses after a given tachometer point signals to determine the phase of the unbalance signals relative to said tachometer point signals.

20. In the method as claimed in claim 19, including the steps of, in the determination of the amplitude of the unbalanced signals, storing said amplitude, and using said amplitude to set the amplitude of the sine wave signals to have the same amplitude for succeeding phase shifts of the balancing signals.

21. In the method as claimed in claim 20, including the steps of, using a counter to count signals clocked to the tachometer point signals in a rate coherence with the tachometer point signals, preloading the counter with a count corresponding to a given phase shift between the tachometer point signals and the phase of the unbalanced signals, and counting said counter with said count signals from said preloaded count at a multiple of the tachometer point signals to provide a carry pulse that initiates the generation of the sine wave balancing signals.

22. A system for locating the unbalance and determining the signal phase of vibration data signals relative to tachometer point signals of a rotating member comprising, means for determining the amplitudes of the unbalance signals of the vibration data signals and providing amplitude output signals, means responsive to said amplitude output signals for generating balancing signals having the frequency of the tachometer point signals and the amplitude of the unbalance signals, means for nulling the balancing signals and the unbalance signals and providing summing output signals, means for shifting the phase of the balancing signals to null the unbalance signals in the nulling means, means for determining said shifted phase, said balancing signal generating means including sine converter means for generating balancing signal sine waves, and means for timing said balancing signal sine waves to be phase coherent with the tachometer point signals prior to shifting the phase of said balancing signal sine wave by said phase shifting means.

* * * * *